United States Patent [19]
Brayton

[11] 3,723,004
[45] Mar. 27, 1973

[54] LASER VELOCIMETER EMPLOYING DUAL SCATTER DETECTION

[75] Inventor: Donald B. Brayton, Tullahoma, Tenn.

[73] Assignee: The United States of America as represented by the Secretary of the Air Force

[22] Filed: May 18, 1971

[21] Appl. No.: 144,515

[52] U.S. Cl................................356/28, 350/285
[51] Int. Cl................................G01p 3/36
[58] Field of Search.........356/28, 111, 113; 350/285

[56] References Cited

UNITED STATES PATENTS 3,548,655  12/1970  Rudd.....................356/28

OTHER PUBLICATIONS

Brayton et al., Proceedings of 16th Intl Aerospace Instr Symposium, May 1970, pp. 14–26.

Primary Examiner—Benjamin A. Borchelt
Assistant Examiner—S. C. Buczinski
Attorney—Harry A. Herbert, Jr. and Willard R. Matthews, Jr.

[57] ABSTRACT

A doppler shift laser velocimeter is disclosed that employs a self-aligning optical system capable of determining one or more velocity components of a moving substance. The beam from a plane polarized laser source is automatically split into two or more plane polarized parallel path beams by one or more parallel surface glass blocks. Certain ones of these beams are then polarization plane rotated and all beams are directed onto a focusing element which automatically focuses them to a common point P in space. Velocity components of a moving substance are detected by photo-detecting radiations simultaneously scattered from the moving substance and from the polarization rotated illuminating beams. Means are connected to the outputs of the photodetectors for determining the frequencies of the electrical signals. These frequencies are proportioned to specific velocity components of the moving substance.

3 Claims, 23 Drawing Figures

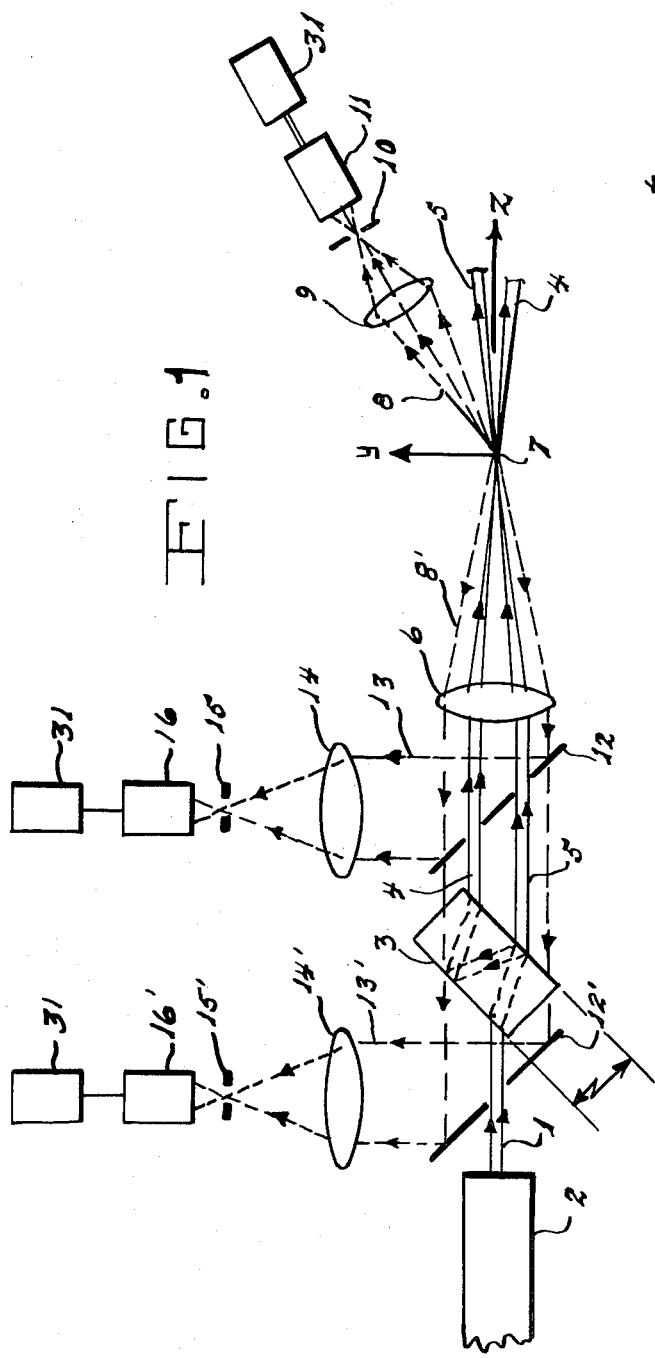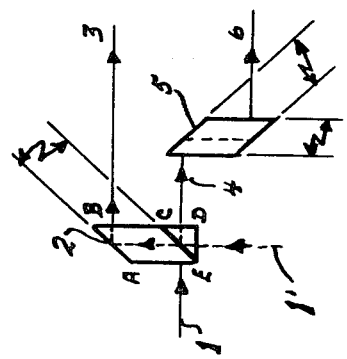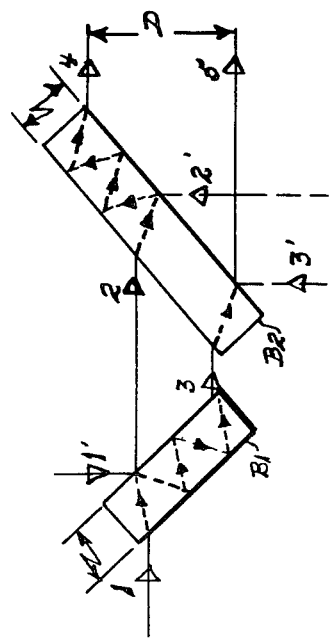

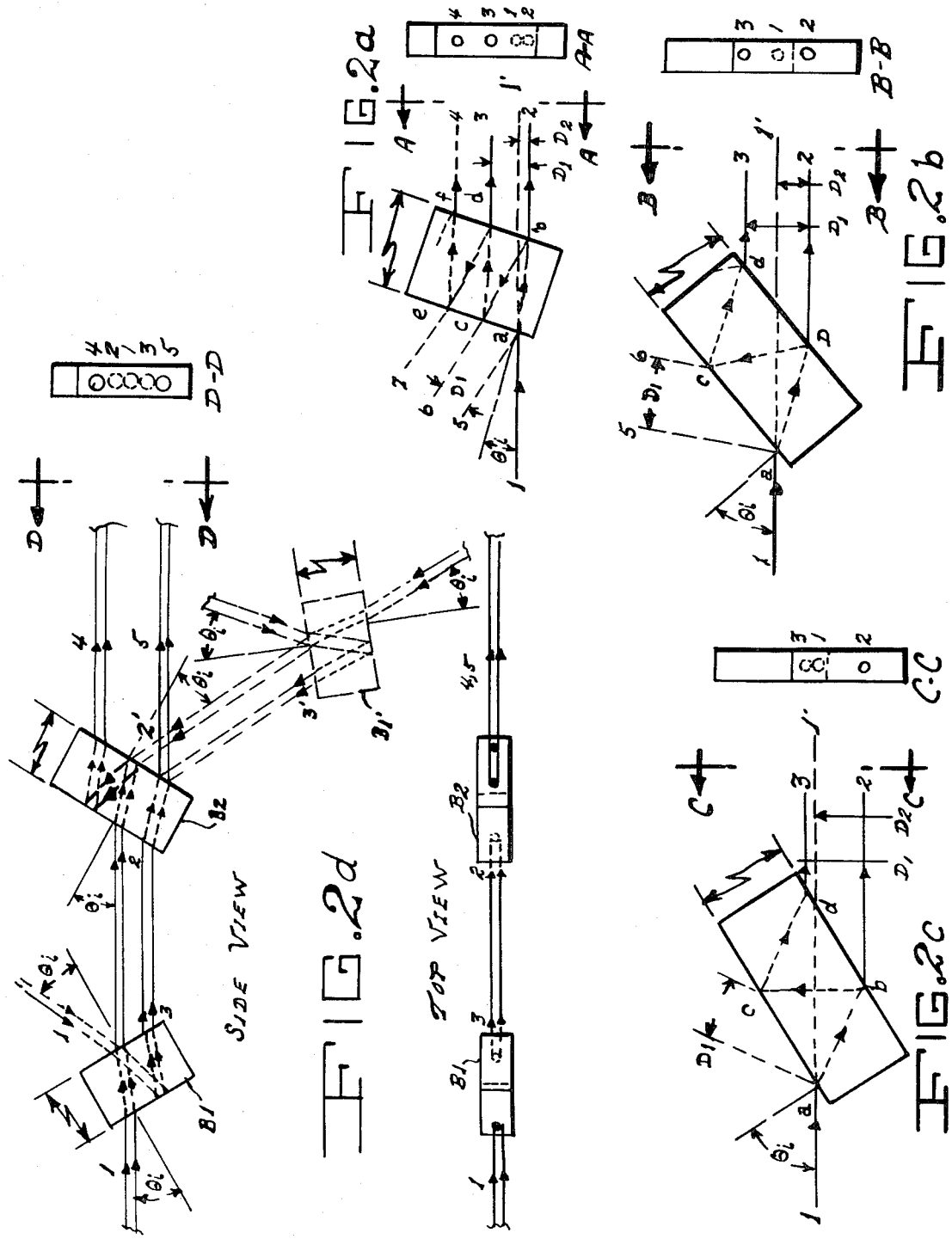

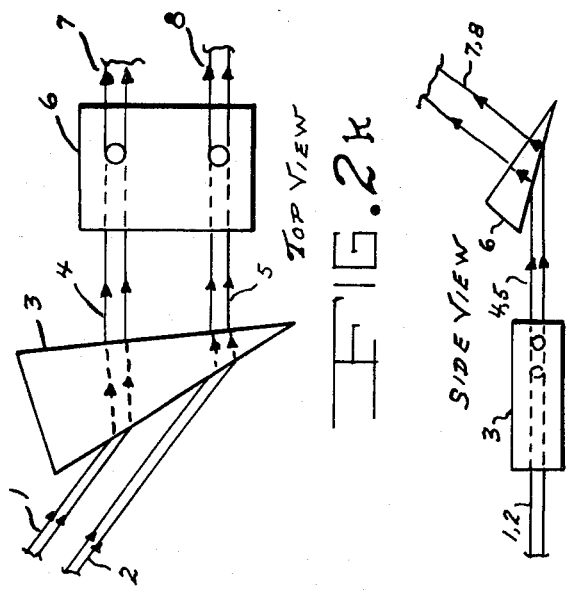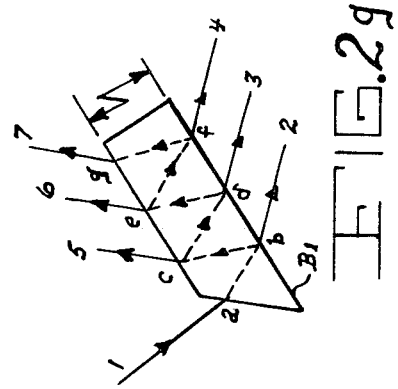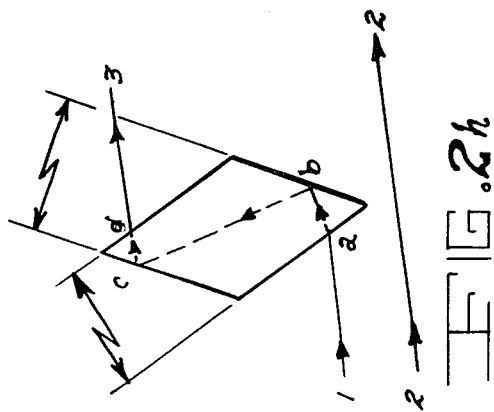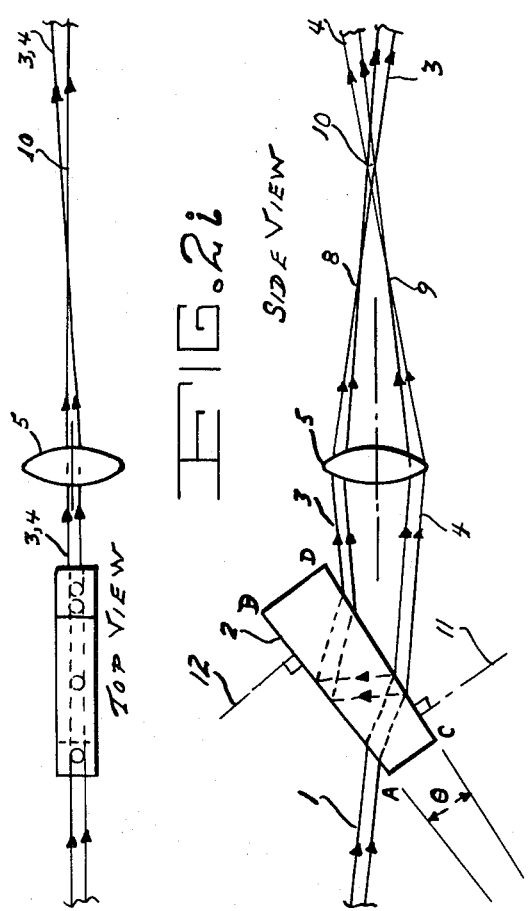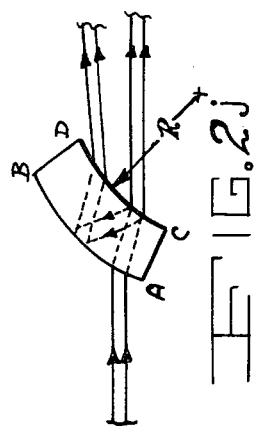

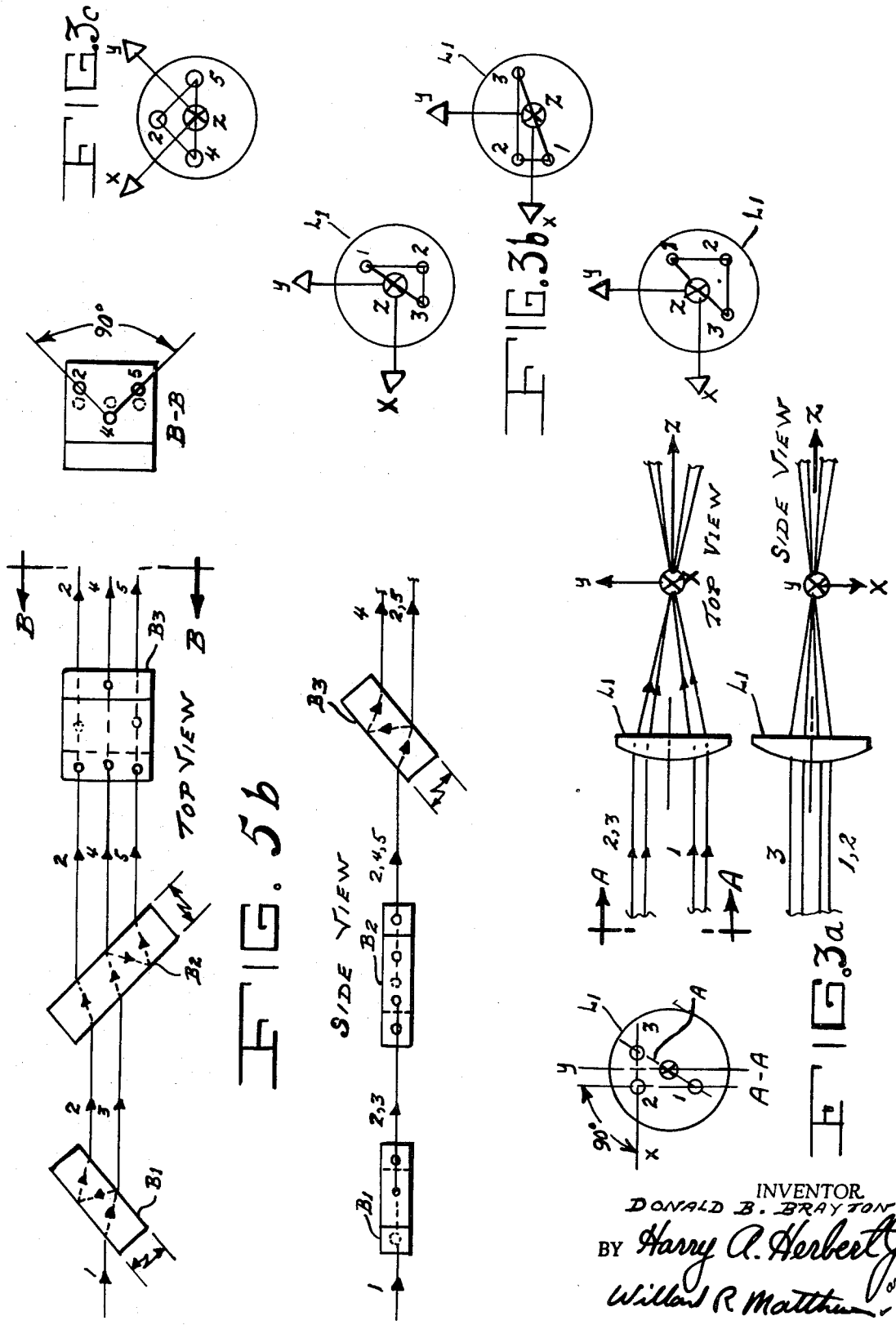

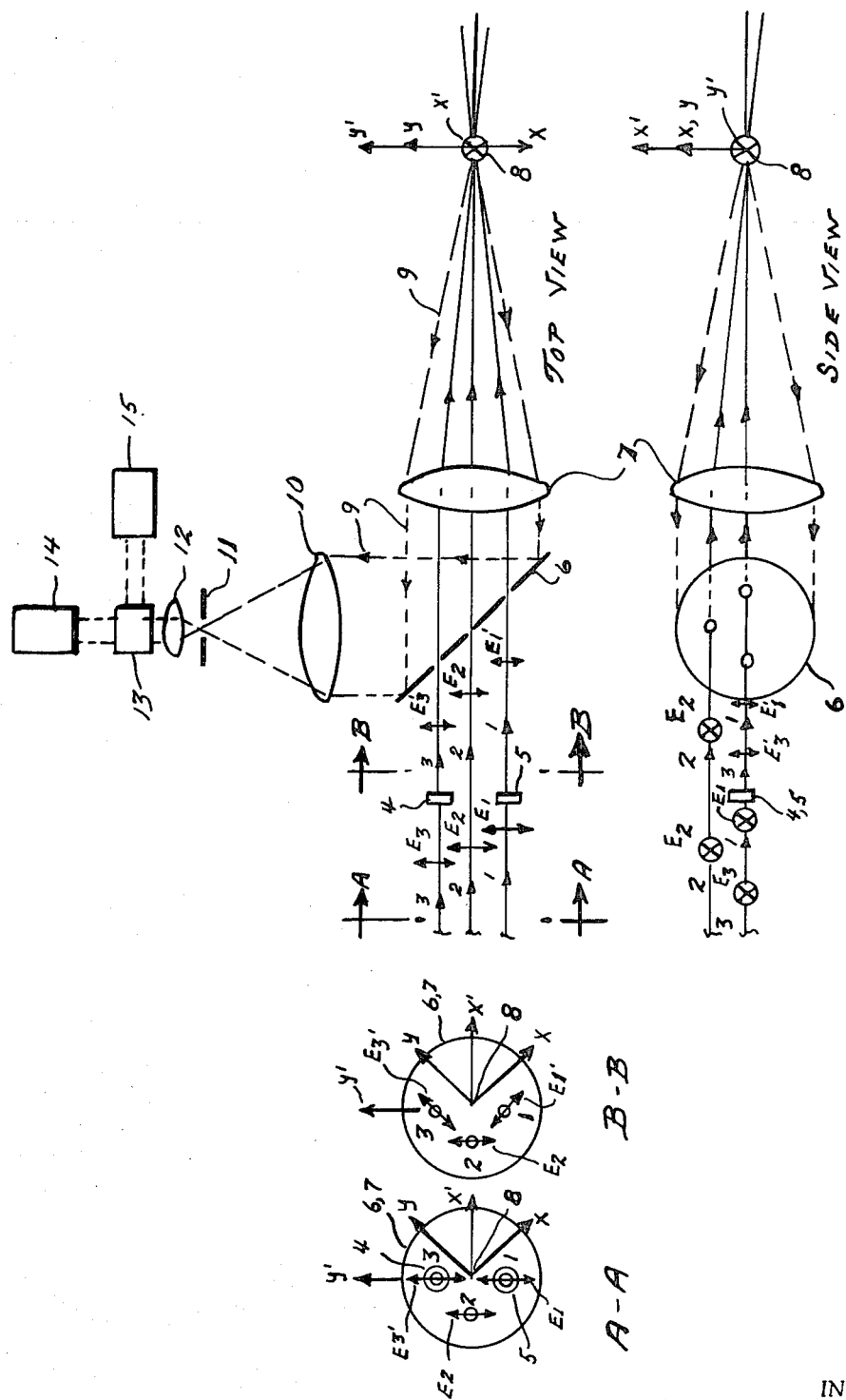

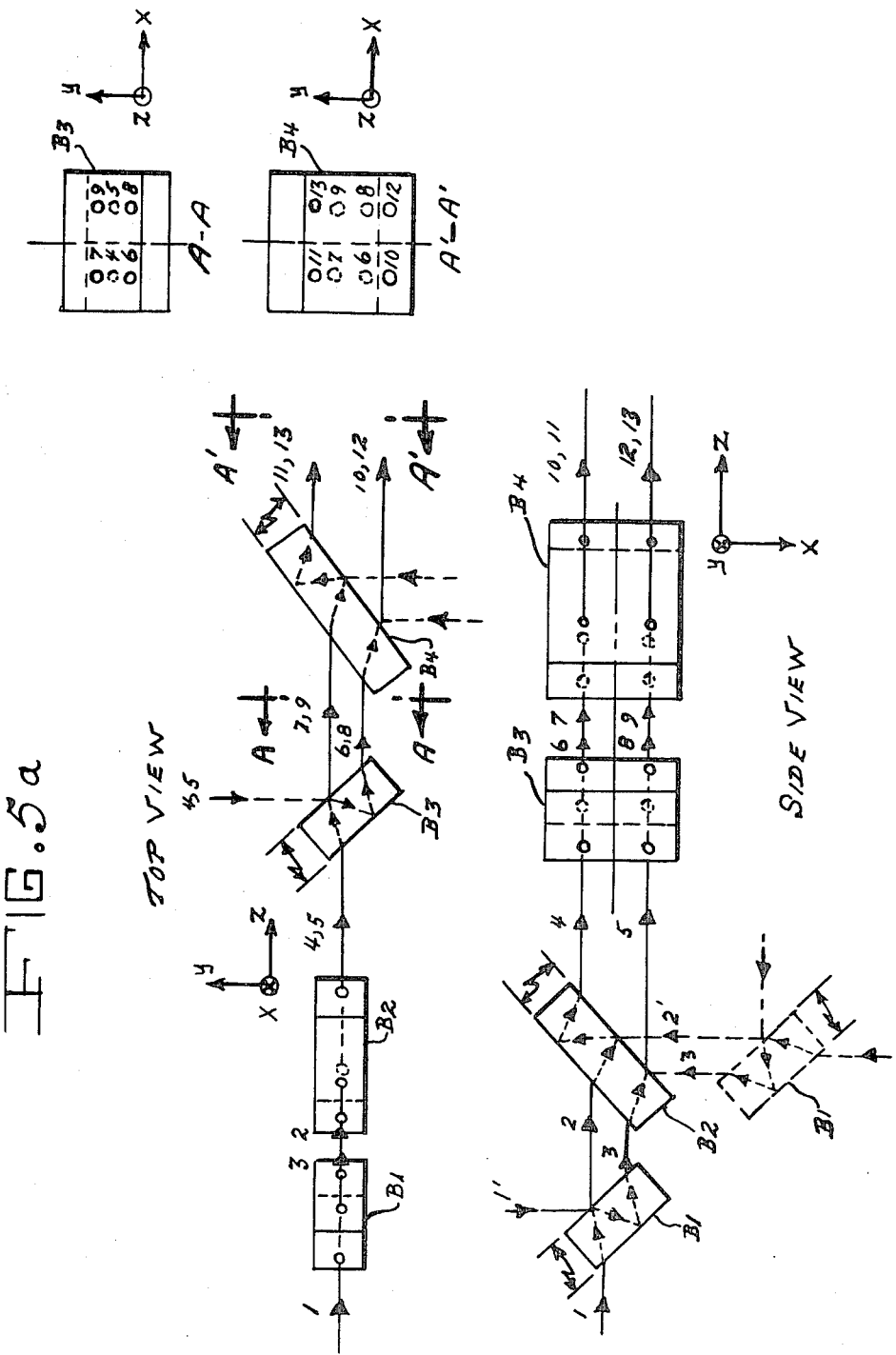

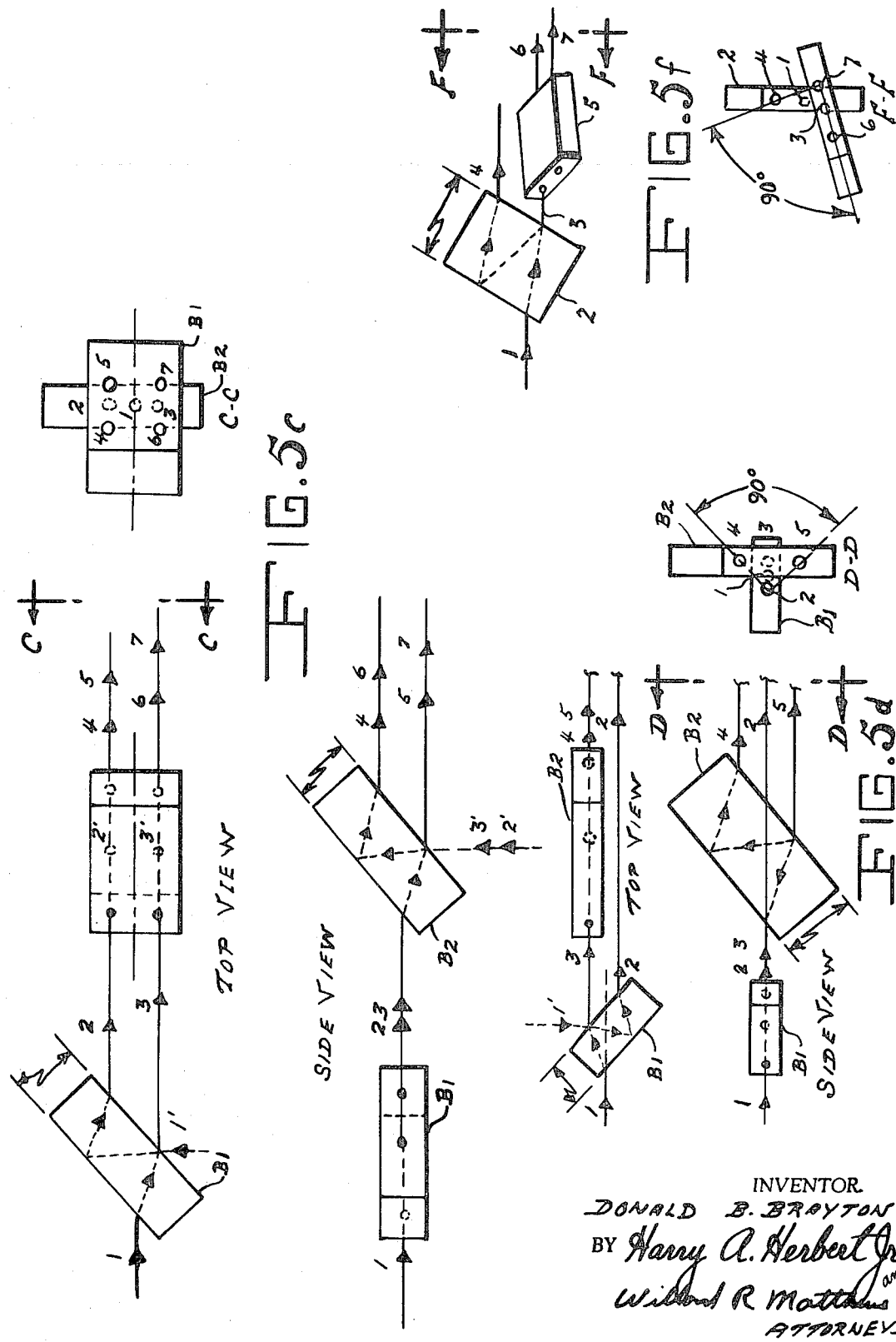

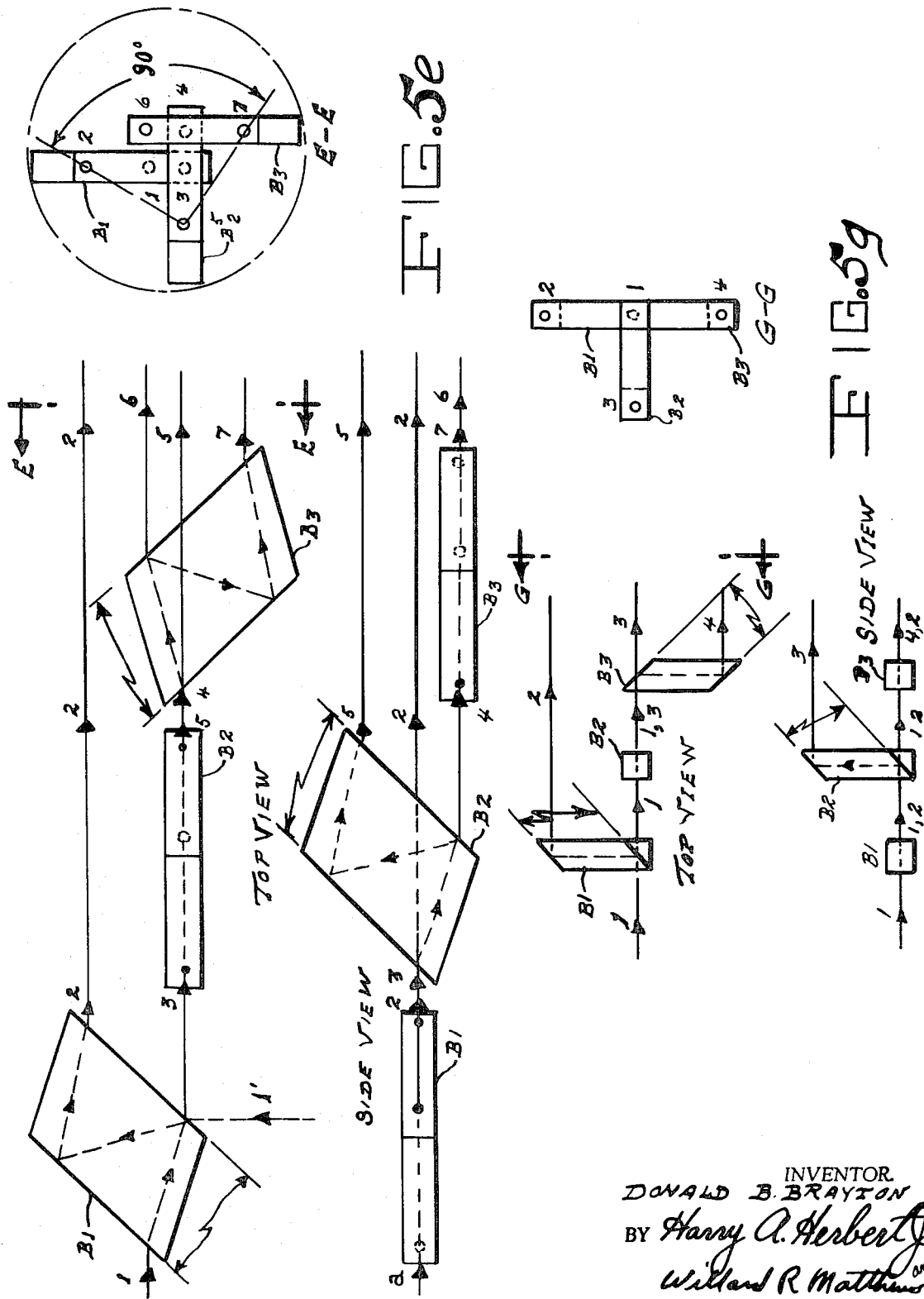

LASER VELOCIMETER EMPLOYING DUAL SCATTER DETECTION

BACKGROUND OF THE INVENTION

The present invention relates generally to a method and means for measuring the velocity of a moving substance, and more specifically comprehends a method of and apparatus for simultaneously measuring one or more velocity components of a moving substance at a common detection point.

Velocity component measurements of a moving substance have in the past commonly been made by mechanical devices. Such measurements are made, for example, to investigate lamina and turbulent fluid flows, boundary layers and shock waves and to acquire frequency and vibration information on a moving surface. It has been found that these and other velocity components measurement applications can be better achieved by the use of laser measuring systems. One primary advantage of using a laser for velocity measurements is that it produces essentially no disturbance in the fluid flow as do mechanical devices. Also, the laser velocimeter overcomes various other disadvantages of mechanical devices: it provides direct measurement without need for further computation and correction factors; it provides instant response to measure transient data; it has the ability to measure very close to the surface of a test object; it is indifferent to highly energetic plasma flow fields; and it has the ability to be used in otherwise inaccessible places. Currently available laser velocimeters, however, require precise alignment of two or more light beams and the maintaining of intercepting beams at a spot in space coinciding with the target or substance being investigated. Vibrations, inadvertent jarring of system components, or any similar occurrence, results in misalignment and consequent misfunction of the device. Furthermore, setting the device up and maintaining precise beam control requires much time and a trained skilled operator. The present invention is directed toward overcoming these and other deficiencies and problems common to currently available devices of this type.

SUMMARY OF THE INVENTION

An embodiment of the invention comprehends a laser velocimeter that is capable of single velocity component measurements. In this embodiment a monochromatic laser source provides a plane-polarized beam that is split by parallel surface glass blocks (or by other beam splitting means hereinafter disclosed) into two plane polarized, parallel path beams. The beam from the laser source is polarized either perpendicular or parallel to its plane of incidence onto the beam splitting means. The two split beams are directed onto a first focusing element which causes them to focus and cross at a common point P in the test region. Light scattered from near the cross point P is collected by a second focusing element and focused onto a small pinhole aperture and thereafter is directed onto a photodetector. Light scattered from cross point P and from the two illuminating beams generates a doppler signal whose frequency is proportional to a specific velocity component of the scatter centers near point P.

A variation of this embodiment utilizes the first said focusing element to also commiate back scattered radiation and direct it by means of a partial mirror disposed between the first focusing element and the parallel surface glass block to an appropriate third focusing element, pinhole aperture and photo detector.

A second variation of this embodiment of the invention provides two orthogonal velocity component dual scatter optical detectors. In this embodiment a laser source and multiple parallel surface blocks provide three parallel path beams that are plane polarized in the same direction. Polarization rotators are used to rotate the polarization planes so that two of the three input beams are polarized at right angles to each other. The three beams are focused by a first focusing element at a common point P. A second focusing element collects and collimates scattered radiation and diverts it by means of a partial mirror to an appropriate lens, pinhole aperture, polarization separation component and two photodetectors. The polarization rotators and the polarization separation component of the system cause one photodetector to receive radiation scattered only from the first and second beams and the other photodetector to receive only radiation scattered from the second and third beams. Those radiations scattered from the first and second beams generate a photodetector current whose frequency is proportional to the $x$ axis velocity component while those radiations scattered from the second and third beams will generate a doppler signal frequency proportional to the $y$ axis velocity component.

Other features and improvements of the invention are included in various beam splitting and beam refracting means which provide equal beam path lengths and beam separation and size control. Certain of other novel beam splitting means permit the use of inexpensive optical components at the expense of only small performance degradation.

It is a principal object of the invention to provide a laser velocimeter having a self-aligning optical system.

It is another object of the invention to provide a new and improved velocity measuring system capable of making one or more simultaneous velocity component measurements of a moving substance without disturbance to surrounding fluid flow.

It is another object of the invention to provide a velocity measuring system capable of making direct measurements without the need for further computation and correction factors.

It is another object of the invention to provide a velocity measuring system that is capable of instant response for the measurement of transient data.

It is another object of the invention to provide a velocity measuring system capable of measurement very close to the surface of a test object.

It is another object of the invention to provide a velocity measuring system that is indifferent to highly energetic plasma flow fields.

It is another object of the invention to provide a laser, doppler shift, velocity measuring system that does not require constant adjustment and manipulation to maintain precise interception of multiple light beams.

It is another object of the invention to provide a laser doppler shift, velocity measuring system that is substantially insensitive to vibrations and inadvertent jarring of system components.

It is another object of the invention to provide a laser doppler shift, velocity measuring system that requires minimum setup time and that can be operated by an unskilled operator.

It is another object of the invention to provide a new and improved velocity measuring system capable of making one or more simultaneous velocity component measurements of a moving solid surface via detecting backscattered radiation.

These, together with other objects, advantages and features of the invention, will become more readily apparent from the following detailed description when taken in conjunction with the illustrated embodiment of the accompanying drawings wherein like elements are given like reference numerals throughout.

DESCRIPTION OF THE DRAWINGS

FIG. 1 is a schematic diagram which illustrates the operating principle of this invention when used in a dual scatter scheme to detect one component of velocity;

FIGS. 2a through 2k are schematic diagrams which illustrate preferred embodiments of the plane-parallel block and planar wedge subcomponents of the invention when used for one velocity component detection;

FIGS. 3a, 3b and 3c are schematic diagrams illustrating for the purpose of explaining how to properly position illuminating beams on the focusing element to detect two orthogonal velocity components;

FIG. 4 is a schematic diagram which illustrates the operating principle of this invention when used in a dual scatter configuration to detect two orthogonal components of velocity; and FIGS. 5a through 5g are schematic diagrams which illustrate preferred embodiments of the plane parallel block subcomponents for use in a two orthogonal velocity component detection system.

DETAILED DESCRIPTION OF THE PREFERRED EMBODIMENT

Referring now to FIG. 1, there is illustrated thereby the use of self-aligning, crossed beam optics in a one velocity component, dual-scatter optical detection scheme. Plane polarized laser beam 1 emerging from laser 2 is split by the parallel surface glass block 3 into two plane polarized, parallel path beams 4 and 5. Parallel output beam paths will result only if the two planar working surfaces of the glass block are parallel. The schematic symbol  denotes two opposing plane parallel surfaces of glass block and is so used throughout the drawings. Beam 1 is polarized either perpendicular to or parallel to its plane of incidence onto block 3. Beams 4 and 5 are then directed onto focusing element 6 which causes them to focus and cross at a common point 7 in the test region. Light 8, scattered from near the cross point 7, is collected by the focusing element 9 and focused onto a small pinhole aperture 10 prior to intercepting the photodetector 11. Light scattered from cross point 7 and from the two illuminating beams 4 and 5 will generate a doppler signal whose frequency is proportional to the y-axis velocity component of the scatter centers near 7. Information means 31 are connected to the output of the photodetector for detecting the frequency of the detected signal, such that y axis velocity component can be detected. It is essential in most dual-scatter optical detection applications that such a spatially selective detection scheme be employed to eliminate extraneously scattered radiations to maximize the signal-to-noise performance. Such would not necessarily be the case for an opaque (nontransmitting) scattering source, however.

A preferred embodiment of the dual-scatter velocimeter is the back-scatter radiation collection mode which is also indicated in FIG. 1. Back-scattered radiation 8' from the illuminating beam cross-over point 7 of FIG. 1 is collected and collimated by focusing element 6. Such back-scattered radiation then intercepts partial (and planar) mirror 12 such that collimated back-scattered radiation path 13 results. Backscattered radiation 13 is then focused by focusing element 14 onto the pinhole aperture 15 prior to intercepting the photodetector 16. Only that radiation scattered from near the cross point 7 will image on pinhole 15, thereby eliminating extraneous scattered light which does not originate from the cross point 7 and which will not contribute doppler frequency information. Elements 6, 12 and 14 thus serve to replace focusing element 9.

Yet another dual-scatter back-scatter collection scheme is indicated in FIG. 1. Back-scattered radiation 8' is again collected and collimated by focusing element 6, then directed by partial mirror 12' to radiation path 13', and finally focused by focusing element 14' onto pinhole 15' prior to intercepting photodetector 16'; for this configuration it is assumed that the glass block 3 is relatively thin (in x dimension) such that it intercepts very little of the back-scatter radiation. It is also assumed that partial mirror position 12 is no longer employed. There exists other similar embodiments of the dual-scatter back-scatter configuration, which use the focusing element 6 to both focus the illuminating beams 4 and 5 and to collect and collimate the back-scatter radiation 9 prior to refocusing, spatially filtering and detecting such backscatter radiation. The optics of such a system, with exception to the focusing element 6, can be mounted to a small mechanical reference frame such that once adjusted to image the probe region 7 onto the pinhole 15, the system performance will be insensitive to mechanical vibrations and/or minor, off-axis movement of the focusing element 6. The system performance will be totally insensitive to axial movement of focusing element 6. The focusing element 6 can then be traversed along its axis to vary the location of the point of interest 7. Signal strength will not deteriorate due to small off-axis displacements or rotations of the focusing element 6 during such translations.

The collimated radiations emitted from and returned to the stationary, rigid package (consisting of components 2, 3, 12, 14, 15 and 16) can be reflected (for example, at 45° incidence) from a series of flat mirrors thus defining (for example, orthogonal x, y, z directed) collimating radiation paths prior to intercepting the focusing element 6. None, one, or more of these mirrors can then be translated with focusing element 6 to move the detection point 7 in one, two, or three (for example, orthogonal) directions. The received signal will not deteriorate due to such translations thus permitting the probe volume to be traversed throughout the test region. A series of planar mirrors could also be employed between the focusing element 6 and the detection point 7 to traverse the detection point 7. Focusing element 6 can consist of beam expansion (or reduction) and refocusing optics to provide a system with a smaller (or larger) probe volume than would otherwise be attainable at a given measuring distance (distance from compound focusing element 6 to the cross point 7). The probe volume of this system can also be translated (by mirrors) in three orthogonal directions. The system is readily adaptable to the measurement of two orthogonal $x$ and $y$ axis, for example, velocity components, by employing different parallel surface glass blocks 3 that cause three parallel illuminating beams to exit from the stationary package (onto the translatable mirrors and the focusing element 6). The previously mentioned advantages also apply to the two component systems hereinafter described. A third orthogonal $z$-axis velocity component could be added to the previously discussed two component system by splitting off a small portion of the laser power from beam 1 and heterodyning it with a portion of the back-scatter radiation collected and collimated by the focusing element 6. The previously mentioned advantages would apply also to this three component system because once the reference radiation was properly aligned with a portion of the collected and collimated back-scattered radiation, it would remain thusly aligned.

FIGS 2a through 2k depict various embodiments of the glass block subcomponent of the invention which can be employed in one component detection systems. FIGS. 2a, 2b and 2c illustrate that many orientations of the input beam onto the parallel surface glass block subcomponent may be used and, furthermore, that many parallel output beam pairs exist (any of which can be used for one component detection). FIGS. 2d and 2e illustrate preferred embodiments that produce two output beams which have traveled identical optical paths. FIG. 2f illustrates an alternate choice of parallel surface glass block component which can effectively be employed. FIG. 2g illustrates that it is not essential that the input beam illuminate one of the plane parallel surfaces. FIG. 2h illustrates that there exists at least one peculiar glass block component which will render an output beam parallel to its input beam.

In FIG. 2a a glass block with two opposing plane parallel surfaces is illuminated by beam 1. Generally there results a series of front directed parallel output beams 2, 3 and 4, and also a series of back directed parallel output beams 5, 6 and 7. The block can be coated such that, for example, only output beams 2 and 4 contain substantial power. As these beams are parallel to one another, they can be used in a one component detection scheme. Many other choices of parallel output beam pairs also exist.

The sequence of FIGS. 2a, 2b and 2c illustrates that as the angle of incidence $\theta_i$ of the input beam onto the glass block is increased, the separation $D_1$ of any two adjacent output beams increases to a maximum value (FIG. 2b) and then decreases as $\theta_i$ is further increased (FIG. 2c). Also, as the angle of incidence $\theta_i$ increases, the displacement $D_2$ of the first transmitted output beam 2 from the projected path 1' (of incident beam 1) continually increases as the $\theta_i$ is increased. It can be shown for most common glass materials that the output beam separation $D_1$ achieves a maximum value for $\theta_i$ approximately equal to 49° incidence. Near this particular angle of incidence the output beam separation $D_1$ is very insensitive to the variations in the angle of incidence $\theta_i$. Thus a preferred embodiment of a one component LDV employing a single block would be to illuminate the block approximately at that particular angle of incidence which causes the output beam separation $D_1$ to be a maximum. (This occurs for $\theta_i \approx 49°$ for visible light if the index of refraction of the glass block is 1.515.) For such an illumination, the output beam separation $D_1$ would be essentially constant and insensitive to small variations of $\theta_i$. Such an orientation of the glass block component would produce a more accurate velocity measurement because doppler frequency to velocity conversion factor is determined solely by the beam separation distance $D_1$ and the focal length of the focusing component.

It also happens that when the output beam separation $D_1$ is a maximum (FIG. 2b) the projection 1' of the illumination beam 1 is equally spaced between the output beams 2 and 3, as shown in FIG. 2b. This fact can be used to simplify the design of a single component detection system as the laser beam axis 1 can now be coincident with the axis of the focusing element, and a symmetrical package design results. This fact will also be used to simplify the design of a two orthogonal velocity component detection scheme.

It is a common known fact with LDV detection schemes that if the optical path lengths of the two illuminating beams (from the laser to the cross point) are not identical, the signal will be degraded as a result. The extent of signal degradation is a function of the coherence length of the laser. One velocity component preferred glass block embodiments that provide equal optical path lengths are shown in FIGS. 2d and 2e.

In FIG. 2d block B1 as illuminated by either input beam 1 or 1' and produces the two output beams 2 and 3. Due to the increased optical path in traveling through block B1, a particular phase front of output beam 3 lags the same phase front of output beam 2. Block B2 serves to re-equalize optical path lengths of the two phase fronts such that output beams 4 and 5 are in phase. In particular this is true if blocks B1 and B2 are of identical thickness and if the angle of incidence $\theta_i$ of the illuminating radiation onto each block is identical. An alternate illuminating position 2', 3' onto block B2 will again serve to equalize optical paths.

FIG. 2e is another preferred embodiment of the parallel surface block subcomponent of the invention which provides equal optical path lengths. Block B1, illuminated by either input beam 1 or 1', produces two parallel output beams 2 and 3. Note that beam 3 has experienced a triple reflection in traveling through block B1, such that the distance D separating output beams 2 and 3 is increased. Block B2 which is illuminated by input beams 2 and 3 or 2' and 3' again serves to equalize optical path lengths. Such a multi-reflection preferred embodiment can be used to advantage to obtain not only equal optical path lengths but also a larger angle between the beams as they converge to focus after passing through the focusing element subcomponent of the invention. Such a condition will produce a smaller probe volume. Note that the length of the blocks B1 and B2 of FIG. 2e can be increased even further to provide more internal reflections and even greater separation of the two output beams. Blocks $B_1$ and $B_2$ of FIGS. 3d and 3c can be positioned to provide maximum output beam separation.

FIG. 2f indicates a particular set of blocks that are somewhat different from those previously discussed, but nevertheless constitute a preferred embodiment of the parallel surface block subcomponent of the invention, as such blocks use a minimum amount of glass material to achieve a given output beam separation. These particular parallel surface glass block subcomponents are also self-aligning in that they produce parallel output beams 3, 4, and 6 such that the parallelism of the output beams is not affected by small displacements or rotations of the block subcomponents. The first block 2 consists of two solid pieces ABCE and CDE of glass glued together after depositing a beam splitter coating on one of the surfaces EC prior to it being glued. Glass block ABCE, with planar surface AB parallel to planar surface CE and with planar surface AE not necessarily parallel to planar surface BC, is glued to glass block CDE (all of whose working surfaces are planar) after deposition of a partially reflecting optical coating on surface CE of either glass piece. It is assumed that the index or refraction of the two glass pieces ABCE and CDE are identical and that the glue region introduces minimum wedge refraction effects. The effects of the glue wedge angle are assumed to be minimized by either (1) choosing a glue whose refractive index is approximately equal to that of the glass material and/or (2) by placing the glued pieces in an interferometer and, while the glue is hardening, adjusting their relative position such that the interferometrically viewed wedge angle between surfaces EC is minimized, or (3) by optically contacting surfaces EC together. After gluing the optical surface BCD is assumed polished such that it is planar. The system readily lends itself to path equalization by insertion of a second glass block component 5 which is a single piece with two sets of opposing plane parallel surfaces. It should be noted that the block 2 of FIG. 2f can be illuminated either by input beam 1 or 1'. It should be noted that in FIG. 2f the input polarization must be either parallel or perpendicular to the reflecting surfaces (AB and EC for example) of each glass block component for the output beams 3, 4 and 5 to be identically polarized.

FIG. 2g illustrates the point that the illuminating beam 1 need not necessarily intercept one of the two plane parallel working surfaces cg and bf to produce a set of parallel output beams. The only essential feature of the parallel surface glass block subcomponent is that by some means the internal ray path ab is generated such that a series of output parallel rays results (rays 5, 6 and 7 are parallel as are rays 2, 3 and 4).

FIG. 2h illustrates two points. First, the figure illustrates (as does FIG. 2f) that one of two parallel rays 1 and 2 can intercept one or more solid glass optical components which render a third parallel ray 3. Secondly, beams 1 and 2 could both simultaneously have intercepted the parallel surface glass block component (of FIG. 2h) and the component would have rendered (assuming both beams intercepted the same set of planar refracting and/or reflecting surfaces) both output beams parallel to one another. Generally, there exists an infinite variety of optical components similar to that of FIG. 2h and which are of a solid glass construction and which will render two or more parallel output beams when illuminated by two or more parallel input beams. Generally, when two or more parallel path beams intercept a planar reflected surface, the resulting set of reflected beams will remain parallel and also be of parallel path. Also, when two or more parallel path beams refract and/or reflect through a refractive, glass-like medium containing planar working surfaces (such as a glass wedge) the output beams will again be parallel to one another. Such techniques, which can be used to advantage for particular applications, do not alter the fact that an initial set of parallel path beams must initially be generated.

In FIG. 2i a non-parallel glass block subcomponent that will reduce the cost is indicated. The planar surfaces AB and CD (the edge views of which are shown) are not parallel but nevertheless produce an LDV with excellent performance characteristics provided the angle $\theta$ between the working surfaces is not too large and is properly oriented. Illuminating beam 1 intercepts the glass block which produces two output beams 3 and 4 which are not parallel. For proper wedge angle orientation, however, these beams will intercept lens 5, focus at points 8 and 9 and cross at point 10. The wedge angle $\theta$ must be oriented such that the plane formed by surface normals 11 and 12 is parallel to the input beam. If such is not the case, the beams 3 and 4 will not cross properly in space.

FIG. 2j illustrates another embodiment of the parallel surface, glass block component of the invention which will also be less expensive. Generally, a large piece of thick, optical quality window glass will neither have flat nor parallel surfaces. However, such glass can usually be cut to produce a usable glass block subcomponent as shown in FIG. 2j. It is assumed that the portion cut is of fairly constant thickness (i.e., that the local radii of curvature of the two working surfaces are approximately equal) and also that the plane formed by the local surface normals is again approximately parallel to the direction of the input beam.

FIG. 2k illustrates a set of optical components which can be used to advantage with the invention. Parallel input beams 1 and 2 refract through glass wedge 3 such that the parallel output beams 4 and 5 are expanded in one dimension. Not only are the beam diameters linearly increased but the beam separation is linearly increased in one dimension. It is assumed that the glass wedges 3 and 6 contain only planar working surfaces. Expanded beams 4 and 5 then intercept the glass wedge 6 which causes them to be linearly expanded in a second dimension. Output beams 7 and 8 are thus linearly expanded in two dimensions. Note that if either wedge is illuminated in reverse, a linear one-dimensional de-expansion results. When placed between the laser and the parallel surface glass block component of the invention, they can be used to expand or de-expand the laser beam in one or two dimensions. A one-dimensional expansion can be used to decrease the probe volume and increase the signal strength without increasing the frequency dispersion. When placed between the parallel surface glass block components and the focusing components they can be used to expand and de-expand the beamsize and spacing of the two beams in one or two dimensions. A two dimensional expansion or de-expansion can be used to decrease or increase the probe volume without increasing the frequency dispersion. It is assumed that the orientation of the polarization onto the glass wedges of FIG. 2k is such that the input beam polarization is either approximately parallel or perpendicular to the plane of incidence such that plane polarized output beams result.

FIG. 3a indicates a means by which two orthogonal components of velocity can simultaneously be detected at a common point. The figure contains three orthogonal views of the focusing element L1 illuminated by the three parallel input beams 1, 2, and 3. For beams 1 and 2 to detect $y$ velocity component (or for beams 3 and 2 to detect $x$ velocity component) the particular beam pair must not only propagate parallel to the $z$ axis (which is assumed coincident with the lens axis) but must also be symmetrically displaced about the $x$-axis (or about the $y$ axis). For such a condition, the three input beams will project a right triangle pattern onto the $x-y$ plane prior to intercepting focusing element L1 such that the hypotenuse A of the right triangle is bisected by the axis of the focusing element. Thus beam 1 and 2 can be $x-y$ translated and will continue to detect $y$ velocity component so long as they remain parallel to the Z axis which is the focusing element axis, and remain equally spaced above and below the $x$ axis. Similarly beams 2 and 3 must be equally spaced about the $y$ axis to detect only $x$ velocity component. FIGS. 3b and 3c indicate a number of positions of the three illuminating beams onto the focusing element L1 that can be used to detect two orthogonal velocity components.

In FIG. 4 the use of self-aligning, crossed-beam optics in a two orthogonal velocity component, dual backscatter optical detection scheme is indicated. It is not intended that the employment of two component scheme be limited to this backscatter collection mode. The laser and the parallel surface block subcomponents are not shown. The input beams 1, 2 and 3 can be generated by blocks similar to those of FIG. 5b, for example with a beam pattern similar to that of FIG. 3c. In FIG. 4, the three parallel input beams 1, 2 and 3 are assumed plane polarized in a common direction prior to intercepting the polarization rotation elements 4 and 5. The polarization directions $E_1$, $E_2$ and $E_3$ of the electric field vectors of the three input beams are indicated. Section AA of FIG. 4 shows that the three beams are initially plane polarized in a common direction (parallel to the $y'$ axis). Section BB of FIG. 4 shows that two of the polarizations have been rotated by 45° such that polarization direction $E_3'$ is orthogonal to polarization direction $E_1'$. Polarization rotators 4 and 5 characteristically transform a plane polarized input beam into a parallel path output beam whose polarization has been rotated. Prior to intercepting the focusing element 7, it is essential that the polarization of beams 1 and 3 be plane polarized at right angles to each other (or cross polarized). It is also essential that the polarization of beam 2 be resolvable into two orthogonal components, one of which is parallel to the polarization of beam 3. Thus, beams 1, 2 and 3 incident upon the focusing element 7 are caused to be plane polarized such that beams 1 and 3 are polarized at right angles, and beam 2 contains a component parallel to that of beam 3 and another component parallel to that of beam 1. It should be noted that many other polarization rotation schemes can be effectively employed to achieve the essential results just described. Radiations 1, 2 and 3 are simultaneously focused by focusing element 7 to the probe region 8. Radiation 9 simultaneously scattered from these beams by a substance moving near 8 is collected and collimated by the focusing element 7. It can be experimentally observed that the radiation backscattered from a particular illuminating beam is polarized approximately parallel to the illuminating polarization of the particular beam. It can also be experimentally observed that when a plane polarized beam reflects from most high reflectivity mirrors, negligible phase shift is introduced such that the reflected radiation is also plane polarized. Thus, the collimated backscattered radiation 9 prior to intercepting lens 10 contains three separate sets of plane polarized radiations where the three sets form a polarization orientation pattern similar to that of the three illuminating beams 1, 2 and 3 such that the radiation backscattered from beam 3 is approximately cross plane polarized with the radiation backscattered from beam 1. These backscattered radiations are then focused by lens 10 onto aperture 11 and then recollimated by lens 12. Elements 7, 6, 10 and 11 serve to collect radiation scattered only from a small region in space and thus minimize extraneous noise. Lens 12 serves to transform the backscattered radiation into a small diameter collimated bundle such that a smaller polarization separation component 13 can be employed most effectively. The polarization separation component 13 will separate out cross components of polarization such that each component leaves component 13 in a different direction. Thus, component 13 causes that radiation backscattered from beam 3 and a portion of that backscattered from beam 2 which is polarized similarly to beam 3, for example, to be separated out and directed toward photodetector 14. It also causes that radiation backscattered from beam 1 and a portion of that backscattered from beam 2 which is similarly polarized to beam 1 to be separated out and directed toward photodetector 15. Thus the polarization rotators and the polarization separation prisms have effectively been employed to cause one photodetector to receive radiation scattered only from beams 2 and 3 and the other photodetector to receive only radiation scattered from beams 1 and 2. Those radiations backscattered from beams 2 and 3 will generate a photodetector current whose frequency is proportional to the $y$ axis velocity component (See Sec. AA, FIG. 4) while those radiations backscattered from beams 1 and 2 will generate a doppler signal frequency proportional to the $x$ velocity component. An example of the polarization rotation component would be a crystal quartz polarization rotator with plane parallel working surfaces, and an example of the polarization separator would be a (high power design) Glan, air-spaced prims. The optics of FIG. 4 have all the advantages of the previously discussed one-component dual-scatter, backscatter unit.

FIGS. 5a through 5g show various glass block subcomponents which generate three or more parallel output beams such that the output beam pattern forms a right triangle. All of the particular embodiments of FIG. 5 can be used in a two orthogonal component velocity detection scheme similar to those previously discussed. In FIGS. 5a through 5e the polarization is assumed to be either parallel or perpendicular to the plane of incidence of the illuminating radiation onto the initial glass block component, such that the polarizations of the three or more output beams are linearly polarized in a common direction. The output beams of FIG. 5 cannot be linearly polarized in a common direction, resulting in a lower efficiency detection system. In FIG. 5g which employs blocks similar to those of FIG. 3f, it is assumed that the illuminating polarization of each block is located either parallel or perpendicular to the reflecting surface of the particular block. In FIGS. 5a and 5b all of the output beams have traveled identical optical paths. Such block schemes are highly efficient but rather expensive due to the large size and number of glass blocks required. In many applications the coherence length of the laser is large enough to justify the use of less expensive blocks which are not path length compensated. Such blocks are indicated in FIGS. 5c, 5d and 5e. The geometry of FIG. 5d is relatively simple and, therefore, inexpensive.

The block design of FIG. 5e is advantageous not only because all the blocks are identical (to reduce cost) but the path lengths are compensated in that they are almost (but not identically) equal.

The blocks of FIG. 5f are probably the least expensive that can be produced for a two-component system. They are of identical size and only two are required. However, they are not path length compensated and they cannot be illuminated such that the polarization plane is parallel or perpendicular to the plane of incidence of both blocks. Such a condition will cause output beams 6 and 7 to be elliptically polarized or to be plane polarized in a direction different from that of beams 3 and 4.

The blocks of FIG. 5g are similar to those of FIG. 3f. They are approximately path length compensated.

In describing the embodiments of the invention illustrated in the drawings, specific terminology has been resorted to for the sake of clarity. However, the invention is not intended to be limited to the specific terms so selected, and it is to be understood that each specific term included all technical equivalents which operate in a similar manner to accomplish a similar purpose.

It is not therefore desired that the invention be limited to the specific arrangements shown and described and it is intended to cover in the appended claims all such modifications that fall within the true spirit and scope of the invention.

What is claimed is:

1. A laser doppler shift two velocity component measuring system comprising,
   means for providing a plane polarized collimated input light beam,
   means for splitting said input light beam into first, second and third plane polarized parallel light beams having an output beam pattern that forms a right triangle,
   polarization rotating means in intercepting relationship with said first and said third light beams,
   means for causing the first and third polarization rotated light beams and said second light beam to converge and focus at a common point,
   a member having a pinhole aperture therein,
   means for collecting light scattered in the vicinity of said common point and focusing it on said aperture,
   polarization separation means positioned to receive light transmitted through said aperture,
   a collimating lens positioned between said aperture and said polarization separation means,
   a first photodetector means positioned to receive light of one polarization from said polarization separation means, and
   a second photodetector means positioned to receive light of another polarization from said polarization separation means.

2. A laser doppler shift two velocity component measuring system as defined in claim 1 wherein said means for collecting light scattered in the vicinity of said common point and focusing it on said aperture includes a partial mirror disposed between said polarization rotating means and said means for causing said first, second and third beams to converge and focus at a common point.

3. A laser doppler shift two velocity component measuring system as defined in claim 2 wherein said means for splitting said input light beam into first, second and third plane polarized parallel light beams comprises parallel surface glass blocks having spatial relationships and orientations adapted to generate at least three parallel output beams having an output beam pattern that forms a right triangle.

* * * * *